United States Patent [19]

Inoue

[11] 4,158,417

[45] Jun. 19, 1979

[54] METHOD OF AND APPARATUS FOR CUTTING OUT THE PACKAGING MATERIAL OF A CYLINDRICAL PACKAGE

[75] Inventor: Yoshito Inoue, Higashimatsuyama, Japan

[73] Assignee: Toyo Seikan Kaisha, Ltd., Tokyo, Japan

[21] Appl. No.: 733,492

[22] Filed: Oct. 18, 1976

[30] Foreign Application Priority Data

Dec. 5, 1975 [JP] Japan .................................. 50-143838

[51] Int. Cl.² ............................................ B65B 69/00
[52] U.S. Cl. ................................. 414/412; 53/381 R; 83/18; 83/54; 83/184; 83/424; 83/924
[58] Field of Search ...................... 83/54, 18, 183, 184, 83/187, 195, 924, 424; 53/381 R; 214/305, 304

[56] References Cited

U.S. PATENT DOCUMENTS

| | | | |
|---|---|---|---|
| 3,266,541 | 8/1966 | Kluytenaar et al. | 214/305 |
| 3,757,973 | 9/1973 | Lambert et al. | 214/305 |
| 3,811,586 | 5/1974 | Lavoie | 214/305 |
| 3,889,442 | 6/1975 | Grahn et al. | 53/381 R |

Primary Examiner—Donald R. Schran
Attorney, Agent, or Firm—Frank J. Jordan

[57] ABSTRACT

Apparatus comprising a pair of endless conveyors arranged on an aligned line with a space therebetween, one of which runs intermittently and the other continuously; a lifter arranged between the conveyors to freely move up- and downwards; a gripper arranged above the lifter to freely close and open its claws; and a cutter arranged immediately below the gripper and attached freely swingable and integral to a cutter plate being freely movable in a direction perpendicular to the direction at which a cylindrical package is conveyed; wherein the front end of the package is brought and stopped above the lifter by means of the intermittently running conveyor; the front end of the package is a little lifted and pressed by the lifter against the claws of the gripper; the gripper closes its claws to grip the packaging material of the package at the upper side thereof and then to hang the package when the lifter returns to its original position; the tip of the cutter is horizontally thrust into the packaging material below the gripped portion thereof; following the opening of the closed claws of the gripper, the intermittently running conveyor is re-driven to further convey the package; and the cutter is swung synchronously with the forward movement of the package to cut out the packaging material along the upper side of the package.

17 Claims, 21 Drawing Figures

METHOD OF AND APPARATUS FOR CUTTING OUT THE PACKAGING MATERIAL OF A CYLINDRICAL PACKAGE

The present invention relates to a method of and apparatus for automatically cutting out the packaging material such as kraft paper and resin-coated paper in which a plurality of can ends or bottle caps are packaged, said ends or caps being of same shape and being piled one another in a cylindrical shape.

As the automatically cutting out method of the aforesaid type, there has been employed the method of pressing a cutter of knife-shaped onto the cylindrical package to form a cut line along the package, or gripping the packaging material of the cylindrical package by a pair of eccentric rolls and cutting out the packaging material below the gripped portion thereof by a rotating cutter of of circular saw shape.

However, in the case of using the knife-shaped cutter, there is the fear of damaging the articles such as can end or bottle cap packaged in the packaging material. In addition, the life of the cutter is so short that it must be often exchanged with a new one, thus lowering the working efficiency of the apparatus and giving bad effect on the whole processing line including the apparatus.

On the other hand, in the case of employing the cutter of circular saw shape, the packaging material below the gripped portion thereof avoids the contact of the cutter at the time of cutting out the packaging material due to the collapsing phenomenon of the packaging material, so that the cutting-out operation by the cutter is often made impossible.

It is, therefore, a primary object of the present invention to provide a method by which the operation of cutting out the packaging material of the cylindrical package can be made full automatic to save the persons requested for the operation.

Another object of the present invention is to provide a method by which a mass of the packages can be processed speedily and continously.

A further object of the present invention is to provide a method by which the operation of cutting out the packaging material of the package can be made without damaging the articles packaged in the package.

A still further object of the present invention is to provide a method by which the operation of cutting out the packaging material of the package can be carried out with high reliability and accuracy, but without failure.

A still further object of the present invention is to provide a method by which the operation of cutting out the packaging material of the package can be carried out reasonably, efficiently and economically.

A still further object of the present invention is to provide a cutter of long life and high performance which can be used in the operation of cutting out the packaging material of the package.

A still further object of the present invention is to provide a compact and durable apparatus of meeting the aforesaid objects and carrying out smoothly and completely the operation of cutting out the packaging material of the package.

These and other objects as well as the merits of the present invention will be apparent from the following detailed description with reference to the accompanying drawings. It should be understood, however, that various changes and modifications without departing from the spirit and scope of the present invention are within the appended claims.

The apparatus of the present invention comprises a pair of endless conveyors arranged on an aligned line with a space, one of which runs intermittently and the other continuously; a lifter arranged between the conveyors to freely move up- and down-wards; a gripper arranged above the lifter to freely close and open its claws; and a cutter arranged immediately below the gripper and attached, freely swingable and integral to a cutter plate being freely movable in a direction perpendicular to the direction at which a cylindrical package is fed; wherein the front end of the package is brought and stopped above the lifter by means of the intermittently running conveyor, which will be hereinafter referred to as the first conveyor; the front end of the package is a little lifted and pressed by the lifter against the claws of the gripper; the gripper closes its claws to grip the packaging material of the package at the upper side thereof and then to hang the package when the lifter returns to its original position; the tip of the cutter is horizontally thrust into the packaging material below the gripped portion thereof; following the opening of the closed claws of the gripper, the first conveyor is redriven to further convey the package; and the cutter is swung synchronously with the forward movement of the package to cut out the packaging material along the upper side of the package.

Accordingly, the method and apparatus of the present invention can attain such effects that; the thrust of the cutter tip is achieved without failure since the packaging material above the portion thereof into which the cutter tip is thrust is securedly gripped by the gripper prior to the thrusting operation of the cutter tip; the gripping operation of the gripper relative to the packaging material at the upper side of the package is highly reliable since the package is previously lifted by the lifter; the cutting-out operation of the cutter is reliably achieved with its tip always thrust into the packaging material, that is to say, the cutter tip is always held in the packaging material at the time of cutting out the packaging material along the upper side of the package; and the cutter blade cuts out only the packaging material of the package without touching the articles packaged in the package, so that neither the articles nor the cutter blade is damaged, thus keeping the life of the cutter long and preventing the operation rate of the processing line from being reduced due to the exchange of the cutter.

Figure 1:
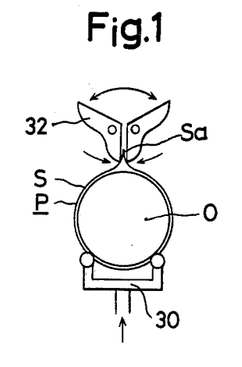
FIGS. 1 to 3 are views showing the stages of operation of the method according to the present invention.
Figure 2:
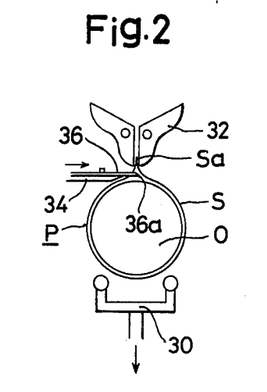
Figure 3:
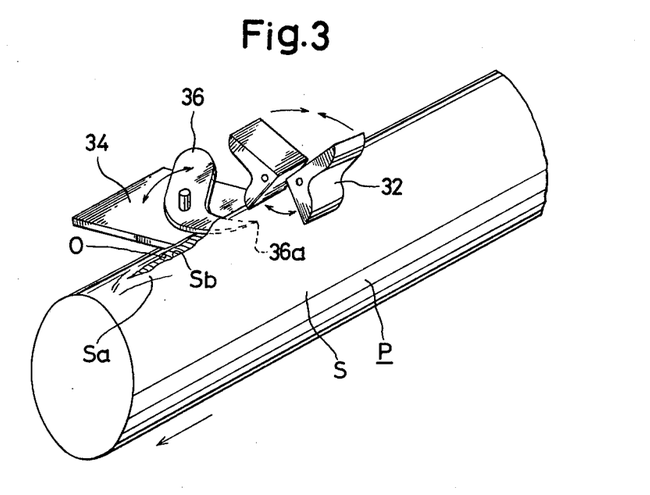

Referring to FIGS. 1 to 3, the method of the present invention comprises a first step of bringing and stopping above a lifter 30 the front end of a cylindrical package P in which a group of piled can ends O are packaged, lifting by the lifter 30 the front end of the package P to be pressed against the claws of a gripper 32 which is arranged above the lifter 30 so as to freely close and open its claws, and closing the claws of the gripper 32 to grip the packaging material Sa at the front upper side of the package P (see FIG. 1); a second step of returning the lifter 30 to its original position to leave the front end of the package P hung from the gripper 32 and thrusting into the packaging material Sa below the gripped portion thereof the tip 36a of a cutter 36 which is attached to a cutter plate 34 (see FIG. 2); and a third step of opening the claws of the gripper 32 to release the packaging material Sa at the upper side of the package P and swinging the cutter 36 on the cutter plate 34 synchronously with a further forward movement of the package P to cut out the packaging material S in a straight line along the upper side of the package P and from its front end to its back end (see FIG. 3). In short, the method of the present invention comprises repeating these steps, from the first step to the third step.

The apparatus of the present invention for enabling these steps to be attained will be now described with reference to FIGS. 4 to 9.

The apparatus A of the present invention comprises left and right side frames 48 and 50, the lower ends of which are fixed through bolts 46 to the insides of left and right beams 42 and 44, respectively, which are mounted parallel to each other and with a space therebetween on bases 38 and 40, an intermittently running conveyor, namely, the first conveyor 52 and a continuously running conveyor 54, which will be hereinafter referred to as the second conveyor, said first and second conveyors being arranged at a same level between the left and right side frames 48 and 50 to convey the cylindrical package P, the lifter 30 arranged between the first and second conveyors and between the left and right side frames at a level same as that of the first and second conveyors to lift the front end of the package P which is brought and stopped above the lifter 30 by means of the first conveyor 52, the gripper 32 arranged above the lifter 30 and attached to a gate bridge 56 bridging the left and right side frames 48 and 50, said gripper 32 being capable of freely closing and opening its claws to grip the packaging material Sa of the package P at the upper side thereof which is lifted by the lifter 30, and the cutter 36 arranged below the gripper 32 and at the right side thereof, the tip 36a of said cutter 36 being thrust into the packaging material Sa below the gripped portion thereof to cut it out along the upper side of the package P synchronously with a further forward movement of the package which is again conveyed by the first conveyor 52 immediately after the package P is released from the gripper 32.

Figure 4:
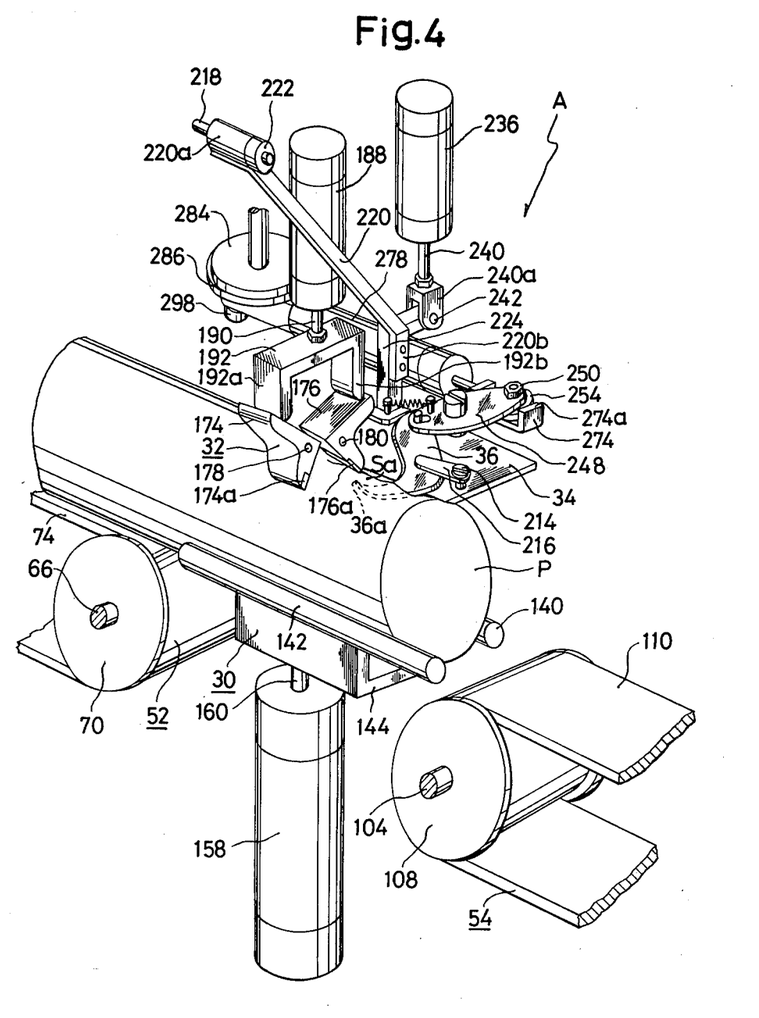
FIG. 4 is a perspective view showing the main components of the apparatus according to the present invention.
Figure 5:
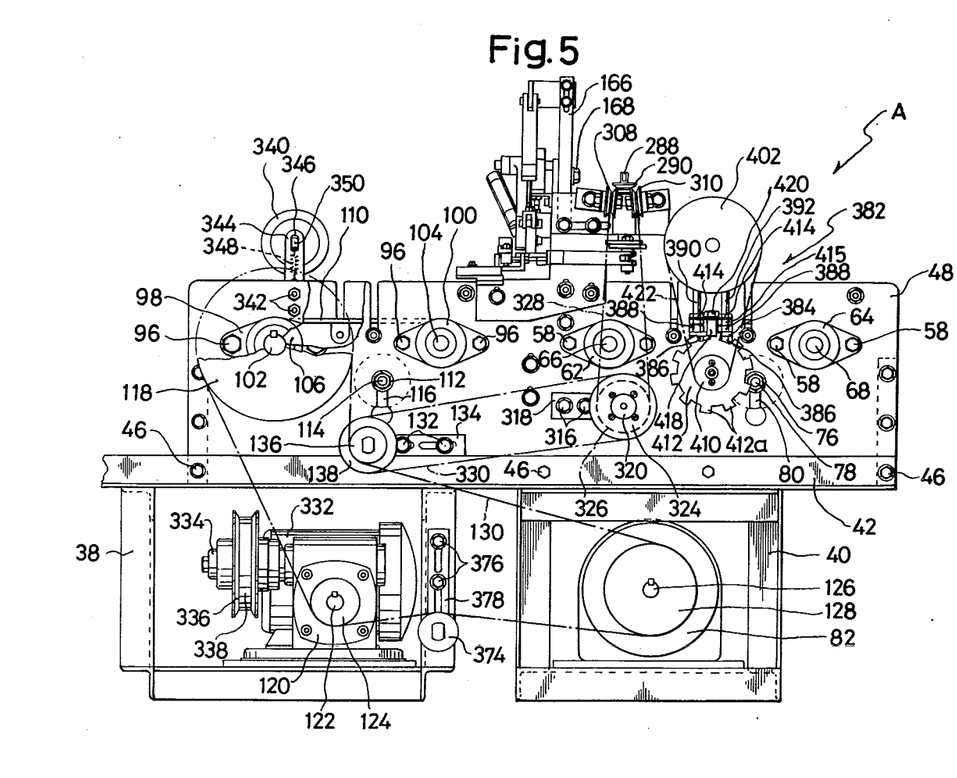
FIGS. 5 and 6 are a left side view and a front view, each partly broken, of the apparatus shown in FIG. 4.
Figure 6:
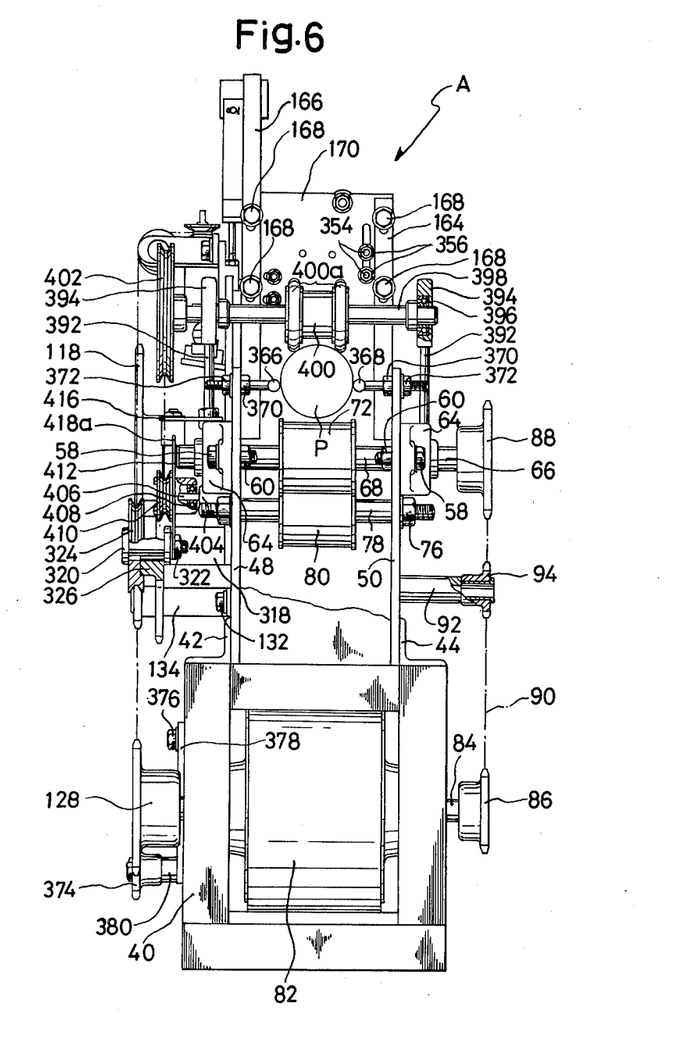

As shown in FIGS. 4 to 6, an endless conveying means employing the first conveyor 52 includes a driving shaft 66 and a driven shaft 68, both ends of which are inserted through and supported by each pair of bearings 62 and bearings 64, respectively, which are attached through bolts 58 and nuts 60 to the outer sides of the left and right side frames 48 and 50, respectively, a driving wheel 70 fixed to the shaft 66 and a driven wheel 72 fixed to the shaft 68, a conveying belt 74 stretched between the wheels 70 and 72 to form an endless conveyor, and a freely idling tension wheel 80 attached to a shaft 78 and contacted with the conveying belt 74 at the lower side thereof to give tension to it, both ends of said shaft 78 being inserted through the left and right side frames 48 and 50 and adjusted by means of nuts 76 in the upper and lower directions. Between a sprocket wheel 86 fixed to the outer end of the output shaft 84 of a clutch brake 82 housed in the base 40 and another sprocket wheel 88 fixed to an end of the driving shaft 66 extending through the right side frame 50 is stretched a chain 90, with which is contacted a freely idling tension sprocket wheel 94 attached to an end of a shaft 92 projecting from the right side frame 50. Therefor, the first conveyor 52 can run intermittently associating with the intermittent drive of the output shaft 84 of the clutch brake 82.

As shown in FIGS. 4 and 5, an endless conveying means employing the second conveyor 54 includes a driving shaft 102 and a driven shaft 104, both ends of which are inserted through and supported by each pair of bearings 98 and bearings 100, respectively, which are attached through bolts 96 and nuts (not shown) to the outer sides of the left and right side frames 48 and 50, respectively, a driving wheel 106 fixed to the shaft 102 and a driven wheel 108 fixed to the shaft 104, a conveying belt 110 stretched between the wheels 106 and 108 to form an endless conveyor, and a freely idling tension wheel 116 attached to a shaft 114 and contacted with the conveying belt 110 at the lower side thereof to give tension thereto, both ends of said shaft 114 being inserted through the left and right side frames 48 and 50 and adjusted by means of nuts 112 in the upper and lower directions. A chain 130 is stretched contacting with a sprocket wheel 118 of large diameter attached to an end of the driving shaft 102 extending through the left side frame 48, a sprocket wheel 124 of small diameter attached to an end of the output shaft 122 of a reduction gear 120 housed in the base 38, and a sprocket wheel 128 of medium diameter attached to an end of the input shaft 126 of the clutch brake 82. In addition, the chain 130 is also contacted with a sprocket wheel 136 of small diameter which is integral to another sprocket wheel 138 of large diameter and which is freely idlingly attached to the left side end of a bracket 134, said bracket being attached to the outer side of the left side frame 48 and adjusted through bolts 132 in the forward and backward directions. Accordingly, the input shaft 126 and the sprocket wheels 136 and 138 are continuously driven by the continuous drive of the output shaft 122 of the reduction gear 120, to thereby enable the second conveyor 54 to run continuously.

Figure 7:
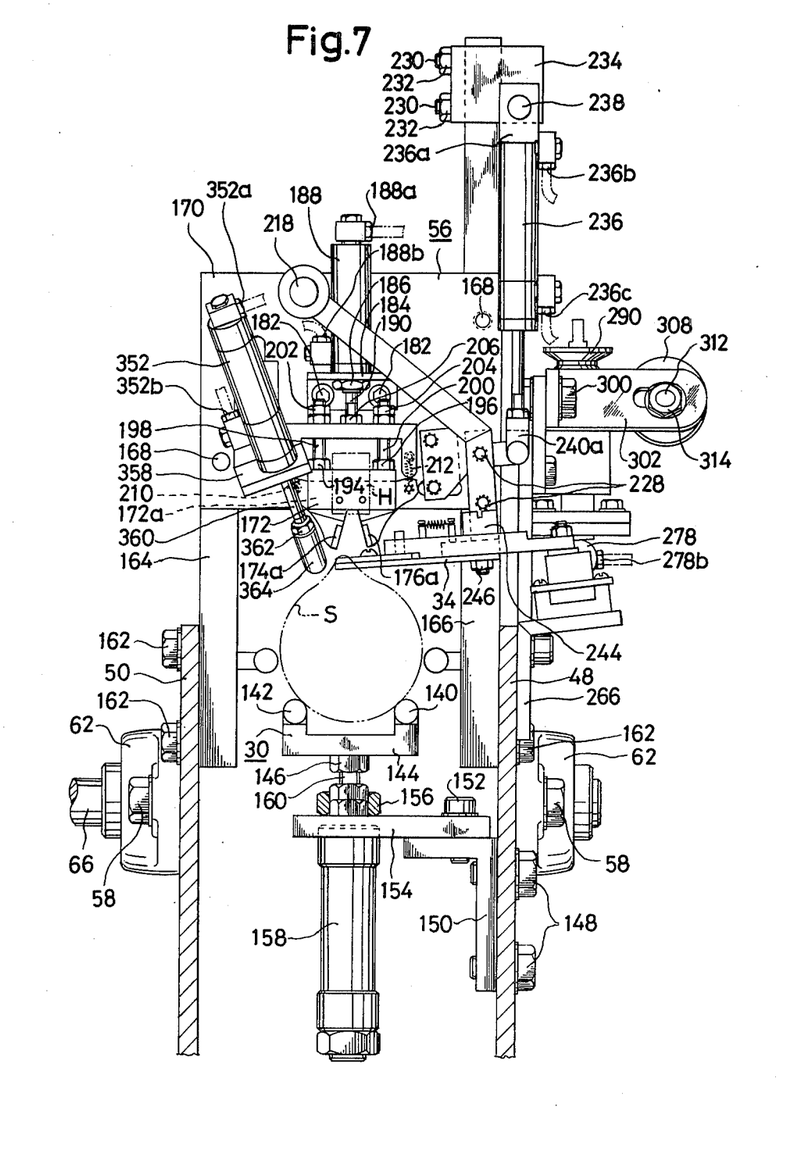
FIGS. 7 and 8 are an enlarged back view of an enlarged left side view, each partly broken, of the main components of the apparatus shown in FIG. 4.

As shown in FIGS. 4 and 7, a lifting means employing the lifter 30 comprises a holding member 144 of trough shape, to the tops of both sides of which are attached guiding rods 140 and 142, respectively, a bracket 150 which is attached to the inner side of the left side frame 48 and adjusted through bolts 148 in the upper and lower directions, a supporting plate 154 mounted and fixed by a bolt 152 on the bracket 150, a lifting cylinder 158 fixedly hung from the supporting plate 154 through a nut 156, and a piston rod 160 capable of coming into and out of the cylinder 158, the top end of said piston rod being threaded into a nut 146 fixed to the bottom center of the holding member 144.

Figure 8:
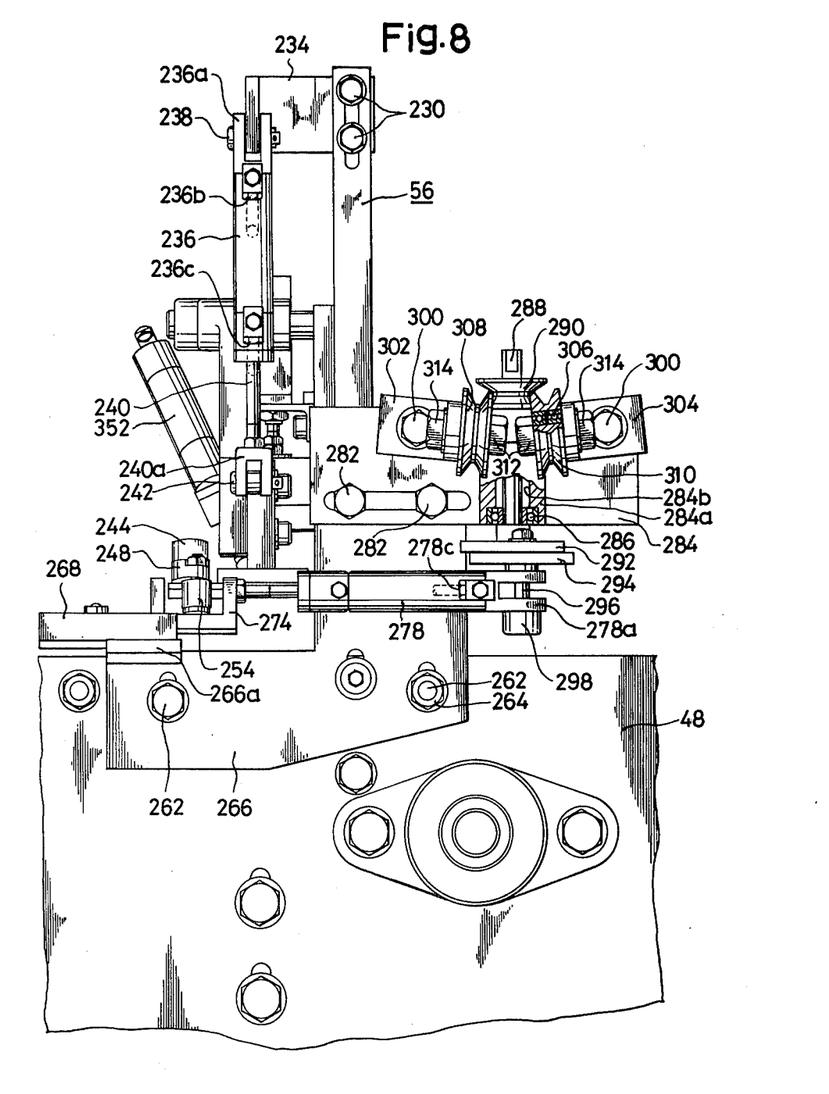

As shown in FIGS. 7 and 8, the gate bridge 56 includes a short square pole 164 and a long square pole 166 of which lower portions are attached through bolts 162 to the inner sides of the left and right side frames 48 and 50, respectively, and a plate 170 attached to the upper portion of the pole 164 and to the center portion of the pole 166 to bridge both poles and adjusted through bolts 168 in the upper and lower directions.

As shown in FIGS. 4 and 7, a gripping means employing the gripper 32 consists of a block 172 fixed to the back and lower central end of the plate 170 and having a recess 172a provided at the underside thereof, a pair of claw members 174 and 176 of same shape which are received in the recess 172a and attached there through pins 178 and 180 in such a way that the claw members freely close and open their claws 174a and 176a, a cylinder 188 fixed on a bracket 184 by a nut 186, said bracket being fixed to the back center of the plate 170, a piston rod 190 capable of coming into and out of the cylinder 188, a pusher 192 of reverse "U" shape whose both ends 192a and 192b are contacted with the inner sides of the upper ends of the claw members 174 and 176 and which is guided in its up and down movement by a pair of parallel guide rods 198 and 200, said guide rods extending through the upper side of the pusher 192 and their lower ends being screwed into nuts 194 and 196 fixed on the left and right upper side ends of the block 172 while to their tops being screwed nuts 202 and 204, and springs 210 and 212 connecting the lower side end 192a to the upper end of the claw members 174 and the other lower side end 192b to the upper end of the other claw member 176, the lower end of said piston rod 190 being screwed into a nut 206 fixed on the central upper side of the pusher 192. Therefore, the pusher 192 moves up and down integral with the movement of the piston rod 190 coming into and out of the cylinder 188, so that the claw members 174 and 176 are pressed and drawn with the pins 178 and 180 functioning as the centers of their movement to close and open their claws 174a and 176a.

Figure 9:
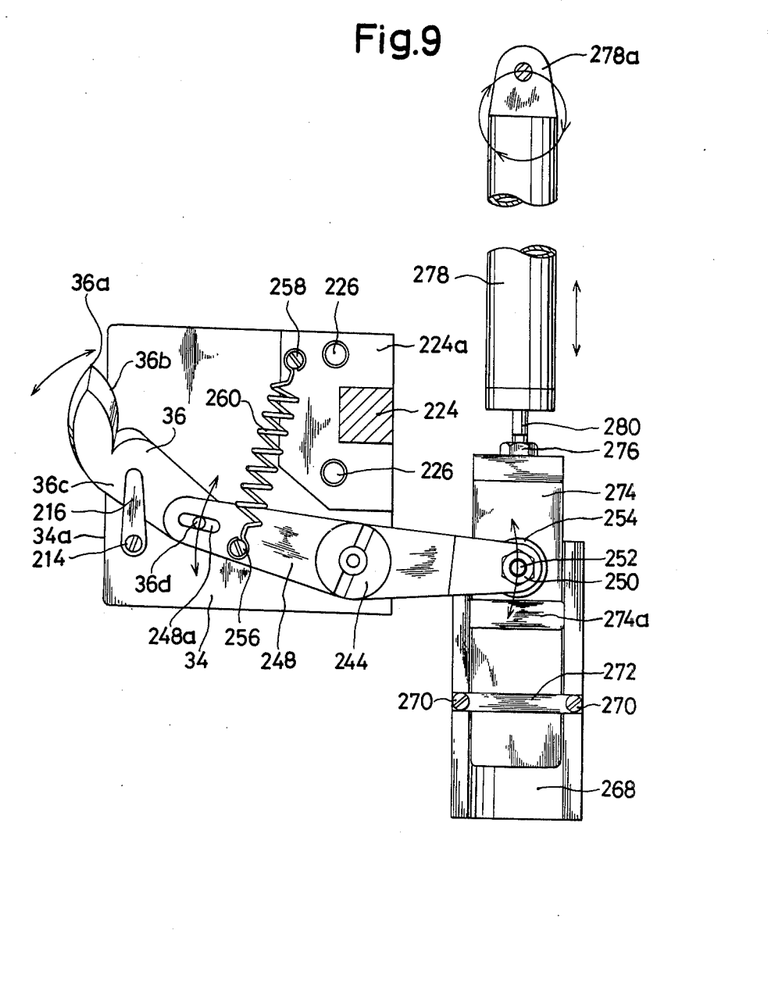
FIG. 9 is a plane view of a cutter assembly showing how the cutter moves.

Referring to FIGS. 4, 7 and 9, the cutter 36 is formed in a sickle shape to have a sharp tip 36a and a blade 36b of crescent shape. The tip 36a of the cutter 36 is directed perpendicular to the direction in which the package P is conveyed at the time of being thrust into the packaging material and the bent portion 36c of the cutter 36 is held by a holding member 216 attached to the cutter plate 34 through a screw 214 in such a way that the bent portion 36c can freely slidably swing on the cutter plate 34. Onto a rod 218 projecting horizontally from the back of the plate 170 is fitted the upper sleeve portion 220a of a swingable arm 220, and a stop ring 222 is attached to the exposed end of the rod 218. The lower bent portion 220b of the arm 220 is contacted with a bent arm 224 of reverse "L" shape and fixed thereto by means of bolts 228, the base 224a of the arm 224 being fixed to the cutter plate 34 at a corner thereof by means of bolts 226. A bracket 234 is attached to the upper portion of the long square pole 166 through bolts 230 and nuts 232 so as to be adjusted in the up- and down-ward directions. To both sides of the bracket 234 is attached through pins 238 the "U" shaped upper portion 236a of a cylinder 236, through which a piston rod 240 can freely slide in the up- and down-ward directions, the lower forked head 240a of said piston rod 240 being attached through a pin 242 to the other portion of the arm 224. As apparent from the above, associating with the movement of the piston rod 240 coming out of and into the cylinder 236, the cutter plate 34 is swung at a certain angle with the rod 218 functioning as its center of swinging, so that the tip 36a of the cutter 36 is forwarded and retreated immediately below the gripper 32.

As shown in FIGS. 7 to 9, a pin 36d projecting from an end of the cutter 36 is inserted into a slit 248a provided at an end of a lever 248, whose center portion is attached to the cutter plate 34 by means of a rotary pin 244 and a nut 246 so as to freely perform a lever-like movement. To the other end of the lever 248 is fixed through a nut 250 a shaft 252, to which is attached a freely idling follower 254. A spring 260 is stretched between a pin 256 provided adjacent to the slit 248a of the lever 248 and another pin 258 provided in the base 224a of the bent arm 224 to always urge the lever 248 clockwise with the pin 244 functioning as its center of movement while to urge the cutter 36 anti-clockwise; so that the blade 36b of the cutter 36 tends to part from the blade 34a of the cutter plate 34. A side plate 266 is attached to the outer side of the left side frame 48 and at the upper center portion thereof and adjusted in the up and down-ward directions by means of bolts 262 and nuts 264. On a shoulder 266a projecting outwardly from the upper end of the side plate 266 is mounted a guide trough 268 parallel to the processing line. The follower 254 attached to an end of the lever 248 and a "U" shaped slider 274 are fitted in the guide trough 268 so as to slide therein in the forward and backward directions, the forward movement of the slider 274 being limited by a stopper 272 bridging the trough 268 through screws 270. The one end of a piston rod 280 is screwed into a nut 276 fixed on the back side of the slider 274 while the other end of the piston rod 280 is inserted into a cylinder 278 to freely slide therein in the for- and back-ward directions, said cylinder 278 itself being capable of freely reciprocating in the for- and back-ward directions. It will be understood, therefore, that following the movement of the cylinder 278, the follower 254 is engaged with the front side 274a of the slider 274 to thereby swing the cutter 36 against the action of the spring 260.

As shown in FIGS. 5 to 8, a bearing plate 284 is attached to the outer and upper right side of the side plate 266 and adjusted through bolts 282 and the for- and back-ward directions. A bearing block 284a projecting from the bearing plate 284 is provided with a vertical through hole 284b at the center thereof, through which a vertical shaft 288 penetrates with its upper and lower portions supported by ball bearings 286. A pulley 290 is fixed to the top of the shaft 288 while a rotary disc 292 to the bottom end thereof. An eccentric disc 294 is attached integral to the rotary disc 292 in such a manner that the former is shifted a little from the latter, and an eccentric shaft 296 extending vertically from the underside of the disc 294 penetrates through a forked portion 278a provided at the back end of the cylinder 278 with a stop ring 298 attached to the bottom end thereof. A pair of brackets 302 and 304 which are slightly slanted opposite each other are attached with the bearing block 284a therebetween to the outer and upper side of the bearing plate 284 and adjusted through bolts 300 in the for- and back-ward directions. Freely idling guide pulleys 308 and 310 are attached to these brackets 302 and 304, respectively, and adjusted through bolts 312 and nuts 314 in the left and right directions, said guide pulleys being provided with ball bearings 306 therein. To the outer side of the left side frame 48 is attached by means of bolts 316 a bracket 318, to which a pulley 324 and a sprocket wheel 326 of medium diameter integral to each other are attached by a rotary pin bolt 320 and a nut 322 so as to idle freely. A transmission rope 328 is stretched contacting with the guide pulley 308, the pulley 290, the guide pulley 310 and the pulley 324 while a chain 330 between the sprocket wheel 326 of medium diameter and the sprocket wheel 138 of large diameter. It will be understood, therefore, that associating with the continuous rotation of the output shaft 122 of the reduction gear 120, the vertical shaft 288 is caused to rotate together with the rotary and the eccentric discs 292 and 294 through the chain 130, the chain 330 and the rope 328, so that the cylinder 278 is reciprocated due to the eccentric rotation of the shaft 296.

In the Figures numeral 332 represents a motor which is housed beside the reduction gear 120 in the base 38 and a belt 338 is stretched between a pulley (not shown) fixed to the outer end of a motor shaft and a pulley 336 fixed to the input shaft 334 of the reduction gear 120. Numeral 340 denotes a pressing roll which is intended to press the cylindrical package P travelling on the second conveyor 54 and to cause the conveying force of the second conveyor 54 to be transmitted to the package P, said pressing roll being freely idlingly attached to a roll shaft 350, both ends of which are inserted into slits 346 with springs 348 attached thereto, respectively, so as to freely move in the up- and down-ward directions, and said slits 346 being provided at the upper ends of a pair of supporting members 344, respectively, which are located at the back end of the second conveyor 54 and attached freely adjustable in the up- and down-ward directions to the inner sides of the left and right side frames 48 and 50 by means of bolts 342. Numeral 352 represents a cylinder which slantly erects on a bracket 358, which is attached freely adjustable in the up- and down-wards to the back of the plate 170 of the gate bridge 56 by means of bolts 354 and nuts 356 (see FIG. 6), and a metal-coated head 364 of bullet shape is attached to the bottom end of a piston rod 360 by means of nut 362, the other end of said piston rod 360 being inserted into the cylinder 352 to freely slide therein. Said head 364 is forwarded to face the tip 36a of the cutter 36 with the packaging material Sa therebetween at the time when the tip 36a of the cutter 36 is about to be thrust into the packaging material Sa and to thereby prevent the packaging material Sa from escaping from the tip 36a of the cutter 36. Numerals 366 and 368 represent "T" shaped guiding members which are attached freely adjustable in the left and right directions to the inner sides of the left and right side frames 48 and 50 by means of nuts 370 and 372, respectively, and which are intended to guide the package P contacting both sides of the package P. Numeral 374 represents a tension sprocket wheel which is freely idlingly attached to a shaft 380 projecting from a bracket 378 which is attached freely adjustable in the up- and down-wards to the base 38 by means of bolts 376. Said sprocket wheel 374 is contacted with the chain 130.

The apparatus A of the present invention includes a timing mechanism 382 for generating pulse signals to control the intermittent movement of the first conveyor 52 resulting from the intermittence of the transmission torque of the input shaft 126 and the output shaft 84 of the clutch brake 82, the closing and opening of its claws of the gripper 32 through the cylinder 188, the up- and down-ward movement of the lifter 30 through the cylinder 158, the forwarding and retreating movement of the cutter 36 integral to the cutter plate 34 and relative to the packaging material S of the package P through the cylinder 236, the swinging movement of the cutter 36 through the follower 254 and the cylinder 278 and the forwarding and retreating movement of the head 364 through the cylinder 352.

As shown in FIGS. 5 and 6, the timing mechanism 382 comprises a counting roll 400, a pulley 402 of large diameter, a pulley 410 of small diameter, a disc 412 having a group of teeth 412a projected at same intervals around the outer circumference thereof and being overlapped integral to the pulley 410, a sensor head 418 and a rope 422 stretched between the pulley 402 and the pulley 410; said counting roll 400 being fixed to a roll shaft 398, both ends of which are inserted through and supported by a left and a right supporting plates 394 through ball bearings 396 provided in these supporting plates, respectively, said left supporting plate 394 being supported by supporting rods 390 and 392 which are fixed, parallel to each other, through nuts 386 and fastening nuts 388 on a bracket 384 attached to the outer side of the left side frame 48 and at a position corresponding to the center of the first conveyor 52 while said right supporting plate 394 being supported by the other supporting rods 390 and 392 which are fixed, parallel to each other, through the other nuts 386 and the other nuts 388 on another bracket 384 attached to the outer side of the right side frame 50 and at a position corresponding to the center of the first conveyor 52; said pulley 402 being fixed to an outer end of the shaft 398 extending through the left supporting plate 394; said pulley 410 and said disc 412 being attached, freely idling, to a shaft 406 through a ball bearing provided therein, said shaft 406 projecting outwardly from a bracket 404 attached to the outer side of the left side frame 48 below the pulley 402; and said sensor head 418 being attached by a nut 420 to the underside of a bracket 416 of which one side is fixed by through nuts 414 and fastening nuts 415 to the left side supporting rods 390 and 392, and having a channel 418a at the underside thereof, through which the teeth 412a of the disc 412 pass; wherein due to the contact between the upper side of the package P travelling on the first conveyor 52 and rings 400a wound around both side circumferences of the counting roll 400, the roll shaft 398 and the pulley 402 are forcedly rotated to rotate the pulley 410 and the disc 412 through the rope 422, so that the sensor head 418 is caused to generate a pulse signal every time when each of the teeth 412a of the disc 412 passes through the channel 418a of the sensor head 418.

Referring to FIGS. 10 to 17 there will be now described how the first conveyor 52, the lifter 30, the gripper 32, the cutter 36, cutter plate 34 and the head 364 are rendered operative associating with one another through the timing mechanism 382.

Figure 10:
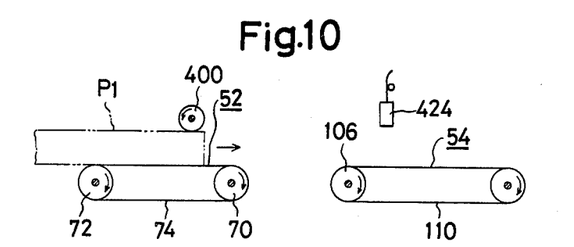
FIGS. 10 to 17 are views showing the stages of operation attained by the apparatus of the present invention through a timing mechanism.
Figure 11:
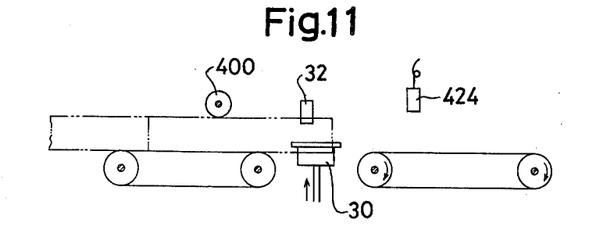
Figure 12:
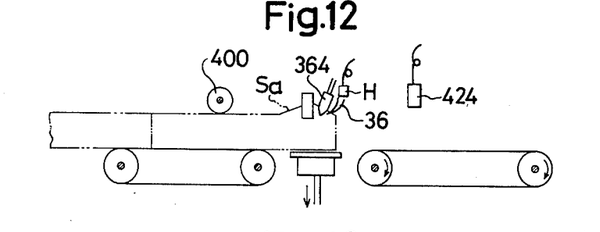
Figure 13:
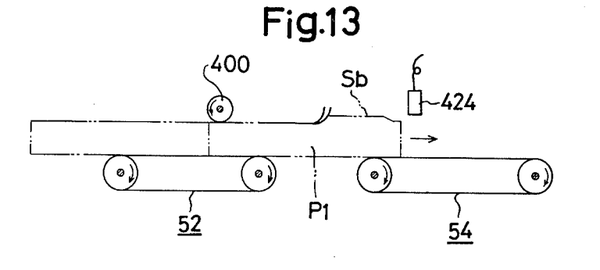

Keeping unoperative a sensor 424 arranged above the second conveyor 54, the motor 332 is started to render the apparatus A of the present invention operative. As shown in FIG. 10, when a package P1 is travelling on the first conveyor 52, the counting roll 400 starts its rotation and the pulse signals generated by the sensor head 418 are counted by a counter (not shown). As shown in FIG. 11, when the counting of the predetermined number of pulse signals corresponding to that of pulse signals generated by the sensor head till the time when the front end of the package P1 is brought above the lifter 30 is finished, the input shaft 126 of the clutch brake 82 is shut off from the output shaft 84 thereof to stop the first conveyor 52 while the lifter 30 is elevated to lift the front end of the package P1 by feeding air pressure into the cylinder 158. At the same time the gripper 32 is caused to close its claws and to grip the packaging material Sa of the package P1 at the upper side thereof, with air pressure being fed into the cylinder 188 through its port 188a and discharged therefrom through its port 188b. As shown in FIG. 12, the lifter 30 is lowered by discharging air pressure from the cylinder 158 and the head 364 is brought to the side of the packaging material Sa gripped by the gripper 32 by feeding and then discharging air pressure into the cylinder 352 through a port 352a and therefrom through a port 352b. When the cutter plate 34 is forwarded, swinging, below the gripper 32 by feeding and then discharging air pressure into the cylinder 236 through a port 236b and therefrom through a port 236c, the tip 36a of the cutter 36 is thrust into the packaging material Sa in a direction perpendicular to that in which the package P is conveyed, and the follower 254 is engaged in the "U" shaped slider 274 which is reciprocating in the for- and back-ward. As shown in FIG. 13, the gripper 32 is caused to open its claws to release the packaging material Sa therefrom by feeding and then discharging air pressure into the cylinder 188 through the port 188b and therefrom through the port 188a, and the head 364 is retreated by feeding and discharging air pressure into the cylinder 352 through the port 352b and therefrom through the port 352a, respectively. At this stage the sensor 424 is rendered operative. When the sensor 424 does not detect the package P1, the input shaft 126 and the output shaft 84 of the clutch brake 82 are connected with each other to again drive the first conveyor 52. Associating with the re-start of the package P1, air pressure is fed into and then discharged from the cylinder 278 through the port 278b and through the port 278c, respectively, to retreat the slider 274. The follower 254 is therefore engaged with the front side 274a of the slider 274 enabling the lever 248 to cause against the action of the spring 260 the tip 36a of the cutter 36 to be directed in the packaging material Sa in a direction reverse to that in which the package P1 is conveyed. At the same time the lever 248 starts its lever-like movement to swing the cutter 36, so that the cutter 36 and the cutter plate 34 are repeatedly swung to close their blades 36b and 34a to each other and to thereby cut out the packaging material Sa of the package P1 with a scissorlike acton along the upper side thereof.

Figure 14:
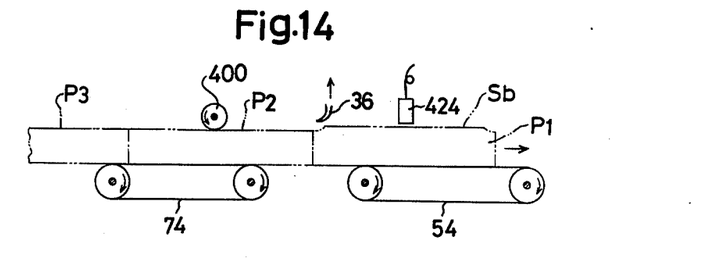
Figure 15:
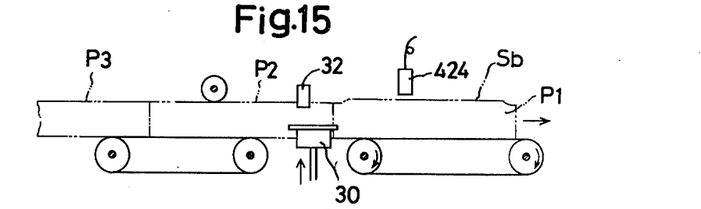
Figure 16:
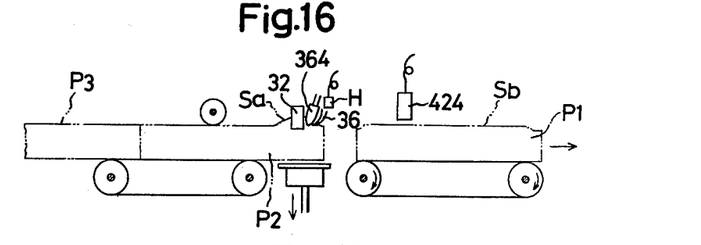
Figure 17:
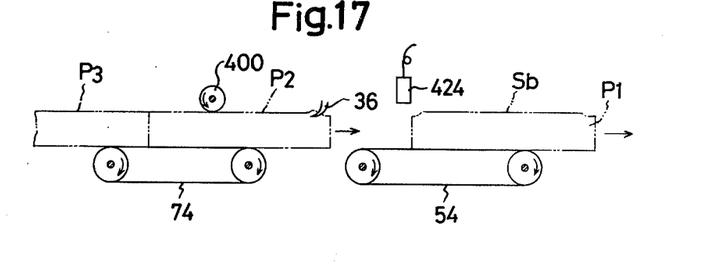
Figure 18:
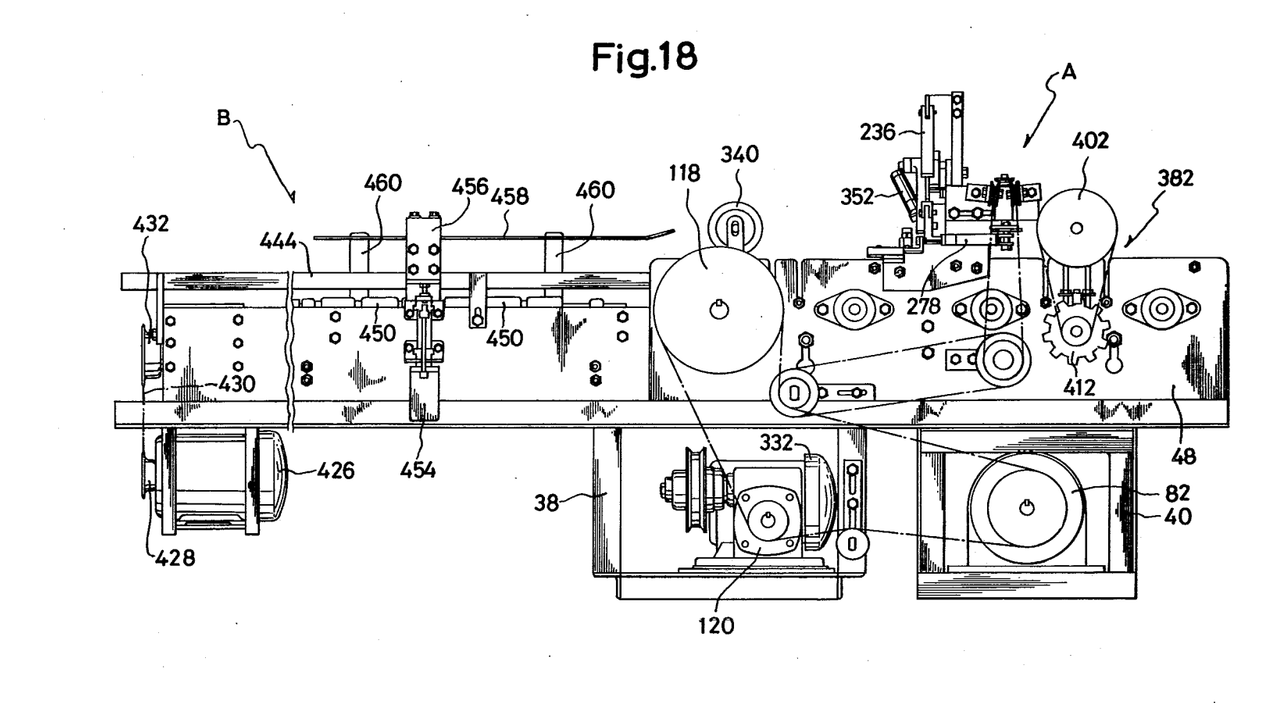
FIG. 18 is a left side view of the apparatus of the present invention and a peeler which are combined with each other to form a processing line.
Figure 19:
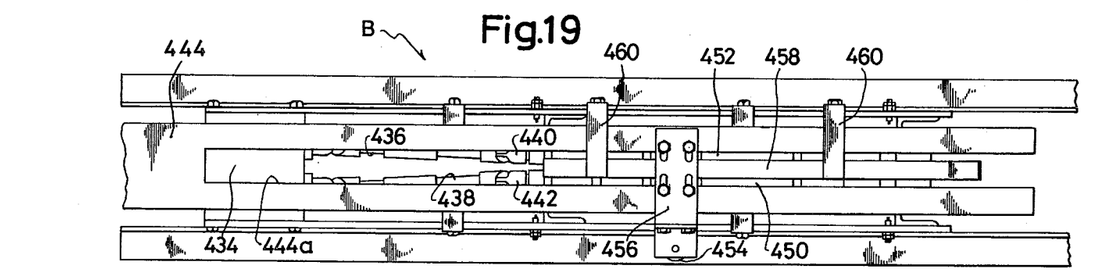
FIGS. 19 and 20 are a plane view and a left side view of the peeler.
Figures 20, 21:
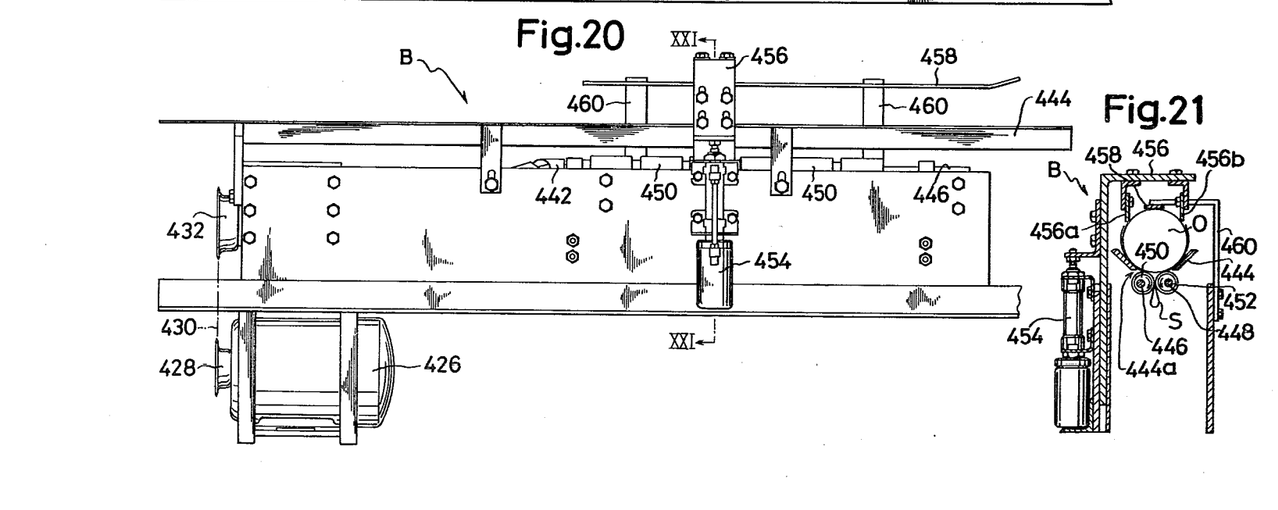
FIG. 21 is a sectional view taken along the line XXI—XXI in FIG. 20.

As the cutting out operation advances as stated above, the front end of the package P1 is brought on the second conveyor 54 as shown in FIG. 13. When the front end of the package P1 passes immediately below the sensor 424, it generates a count starting signal and the counter (not shown) starts to count the pulses generated by the sensor head 418 responding to the rotation of the counting roll 400. When the predetermined number of pulses generated by the sensor head till the time when the back end of the package P1 is brought to a position at which the cutter 36 is located as shown in FIG. 14 is counted by the counter (not shown), air pressure is fed into and then discharged from the cylinder 278 through the port 278c and through the port 278b, respectively, to forward the slider 274 and the follower 254 is therefore released from the front side 274a thereof to stop the swinging movement of the cutter 36. At the same time air pressure is fed into and then discharged from the cylinder 236 through the port 236c and through the port 236b, respectively, to retreat the cutter 36 and the cutter plate 34 from the packaging material Sa of the package P1. Then, after the lapse of the predetermined period of time, t1 seconds, during which the front end of a package P2 following the package P1 is brought above the lifter 30 as shown in FIG. 15, said lapse of time, t1, being measured by a timer (not shown) set at the moment when the counter (not shown) finishes its counting, the clutch brake 82 is operated similarly in FIG. 11 to stop the first conveyor 52 and the lifter 30 is operated through the cylinder 158 to lift the front end of the package P2. At the same time the gripper 32 is operated to close its claws and to grip the packaging material Sa of the package P2 at the upper side thereof through the cylinder 188. After the lapse of the predetermined period of time, t2 seconds, which is measured by the timer set at the time when the counter finishes its counting, the cylinder 158 is operated similarly in FIG. 12 to lower the lifter 30 as shown in FIG. 16. The head 364 is brought through the cylinder 352 to the side of the packaging material Sa gripped by the gripper 32 while the cutter plate 34 and the cutter 36 are forwarded, swinging, below the gripper 32 through the cylinder 236 to thrust the tip 36a of the cutter 36 into the packaging material Sa, and the follower 254 is engaged in the slider 274 which is reciprocating in the for- and back-ward directions. The cylinder 188 is operated similarly in FIG. 13 to cause the gripper 32 to open its claws and to release the packaging material Sa as shown in FIG. 17, and the head 364 is retreated through the cylinder 352. At this stage, when the back end of the top package P1 which is being conveyed by the second conveyor 54 passes below the sensor 424, it generates a non-detection signal. The clutch brake 82 is therefore operated to again start the first conveyor 52 and associating with the start of the package P2 the cylinder 278 is operated to surely engage the follower 254 with the front side 274a of the slider 274 and to swing the cutter 36 to start its cutting-out operation of the packaging material Sa of the package P2.

A cycle of process starting from the step shown in FIG. 13 and ending to the one shown in FIG. 17 is then repeated to cut out the packaging material of each of the following packages continuously.

If the tip 36a of cutter 36 should fail in being thrust into the packaging material Sa and be exposed at the outside of it, or come out of it during the cutting-out operation to make the operation impossible in the course of the process advancing from FIG. 12 to FIG. 13 and from FIG. 16 to FIG. 17, a photoelectric detector head H of reflecting type arranged immediately above the tip 36a of the cutter 36 at the time when the tip of the cutter is thrust into the packaging material Sa generates a detection signal catching a light reflected from the surface of the tip 36a of the cutter 36. Accordingly, the first conveyor 52 is immediately stopped and the cutter 36 is retreated. Then, the lifter 30 is lifted, the gripper 32 is caused to close its claws and to grip the packaging material Sa of the package P1 or P2, the head 364 is forwarded, the lifter 30 is lowered and the tip 36a of the cutter 36 is again thrust into the packaging material Sa. The photoelectric detector head H continues its watching till the tip 36a of the cutter 36 is correctly thrust into the packaging material Sa. When correct thrust of the tip 36a of the cutter 36 is attained, the process advances further.

The packages, each of which has had its packaging material cut out along its upper side as stated above, are conveyed one after another to a peeler B subsequent to the apparatus A of the present invention.

Referring to FIG. 18 to 21, the peeler B comprises a motor 426 having a sprocket wheel 428, a sprocket wheel 432 driven by the motor 426 through a chain 430 contacting with the wheel 428, a transmission means 434 driven by the moter 426 through the sprocket wheel 432 and connected to driving shafts 446 and 448 through shafts 436 and 438 and through universal joints 440 and 442, said shafts 446 and 448 being driven in their outward directions, respectively, and arranged parallel to each other below and along both sides of a bottom slit 444a of a "V" shaped travelling passage 444, a group of eccentric rollers 450 fixed to the shaft 446 and a group of eccentric rollers 452 fixed to the other shaft 448 so as to correspond to those fixed to the shaft 446, a pushing cylinder 454 attached to an outer central side of the peeler B, a pusher 456 arranged above the rollers 450 and 452 and caused to freely move in the up- and downwards through the cylinder 454, said pusher 456 having arms 456a and 456b extending downwards therefrom to push down upper sides of the package P along its cut-out line.

In the Figures numeral 458 represents a pressing plate attached to supporting members 460.

As apparent from the above, the package P is pushed by the following ones from the second conveyor 54 onto the travelling passage 444, where the pusher 456 pushes from above both upper sides of the package P along its cut-out line while the rollers 450 and 452 contacted with both lower sides of the package P are driven to draw the packaging material S of the package P downwards, thus enabling the packaging material S to be peeled off from the package P without failure and without damaging the can ends O packaged in the package P.

Then, the can ends O thus exposed are conveyed to an automatic seamer (not shown) subsequent to the peeler B.

What is claimed is:

1. Apparatus for cutting the package material of an elongated package containing a product comprising conveying means for moving the package forwardly along its longitudinal axis, said conveying means comprising a first and second aligned conveyor with a space therebetween, means for operating said first conveyor intermittently such that the first conveyor is operable to advance the package and then stop the package, lifting means disposed in the space between the said first and second conveyors, said lifting means being operable to lift the forward longitudinal end portion of the package when the latter has stopped its advancement by the first conveyor, gripping means disposed above said conveying means for gripping the upper side of the packaging material after the lifting means lifts the forward longitudinal end portion of the package, a cutting means comprising a tip element, said cutting means being operable to thrust said tip element into the packaging material between the gripped upper side thereof and the product, said gripping means being operable to release the gripper upper side of the package material after said tip element has been thrust into the packaging material, and means for actuating the cutting means to effect a scissor-like cutting action operable to cut the package material as the package is moved forwardly by said conveying means.

2. Apparatus according to claim 1, wherein said lifting means is operable to be lowered after said packaging material has been gripped by said gripping means and prior to thrusting of said cutting tip element into said packaging material, said first conveyor means being operable to advance said package forwardly after said tip element has been thrust into said packaging material whereby the package is advanced to the second conveyor, said second conveyor operating continuously to thereby advance said package as the packaging material is cut by said cutting means.

3. Apparatus according to claim 1, wherein the lifting means comprises a lifting cylinder, a piston rod operable by the lifting cylinder, a holding member of trough shape attached to the piston rod, and parallel guiding rods attached to the tops of both sides of the trough shaped holding member and on which the front end of the package is supported.

4. Apparatus according to claim 1, comprising driving means having an input shaft and a clutch brake having an output shaft, and a timing mechanism for generating pulse signals to control the intermittent movement of the intermittently operating conveyor and the operation of the gripping means, the lifting means, and the cutting means by said driving means.

5. Apparatus according to claim 4, wherein the timing mechanism comprises a counting roll in contact with the upper sides of the package travelling on the intermittently operated conveyor, the counting roll having a roll shaft, a pulley of large diameter fixed to the roll shaft of the counting roll, a disc having a group of equally spaced teeth projecting from the outer circumference of the disc, a sensor head having a channel at the underside thereof through which the teeth of the disc pass, a pulley of small diameter overlapping and integral with the disc, and a flexible member stretched between the pulleys.

6. Apparatus for cutting the package material of an elongated package containing a product comprising conveying means for moving the package forwardly along its longitudinal axis, gripping means disposed above said conveying means for gripping the packaging material at an upper side, said gripping means comprising a pair of claw members, a block having a recess provided in the underside of the block, and pins mounted on the claw members and the block for pivotally mounting the claw members on the block whereby the claw members are pivotal between open and closed positions, said gripping means further comprising an inverted U-shaped pusher member having downward depending spaced leg portions engaging the claw members, spring means connecting the leg portions to the claw members, and a cylinder-piston means having a piston rod connected to the pusher member for effecting up and down movement of the pusher member to thereby open and close the claw members, a cutting means comprising a tip element, said cutting means being operable to thrust said tip element into the packaging material between the gripped upper side thereof and the product, said gripping means being operable to release the gripped upper side of the package material after said tip element has been thrust into the packaging material, and means for actuating the cutting means to effect a scissor-like cutting action operable to cut the package material as the package is moved forwardly by said conveying means.

7. Apparatus according to claim 6, wherein the gripping means further comprises a pair of parallel guide rods fixed to the block, the pusher member being guidingly supported by the guide rods as the pusher member is moved up and down by the cylinder-piston means.

8. Apparatus for cutting the package material of an elongated package containing a product comprising conveying means for moving the package forwardly along its longitudinal axis, gripping means disposed above said conveying means for gripping the packaging material at an upper side, a cutting means comprising a tip element, said cutting means being operable to thrust said tip element into the packaging material between the gripped upper side thereof and the product, said tip element comprising a cutting blade having a generally crescent configuration and having a sharp tip portion, the cutting means further comprising a cutter plate on which the blade is pivotally mounted such that the tip portion of the tip element is operable to be thrust into the packaging material in a direction generally perpendicular to the direction at which the package is conveyed, said gripping means being operable to release the gripped upper side of the package material after said tip element has been thrust into the packaging material, and actuating means for actuating the cutting means to effect a scissor-like cutting action operable to cut the package material as the package is moved forwardly by said conveying means, said actuating means comprising a lever pivotally mounted on the cutter plate, a pin operably connecting one end portion of the lever and the cutting blade, a follower mounted on the other end portion of the lever, a cutter cylinder having a piston rod, a U-shaped slider mounted on the end of the piston rod, and a guide trough in which the U-shaped slider is slidably mounted, the follower being accommodated in the U-shaped slider such that reciprocal movement of the piston rod effects reciprocal movement of the slider which in turn engages the follower to effect oscillating movement of the cutting blade relative to the cutter plate, the cutter plate having a cutting edge cooperating with the cutting blade to provide said scissor-like cutting action with the oscillating cutter blade.

9. Apparatus according to claim 8, wherein the cutter cylinder has a forked longitudinal end portion, and an eccentric shaft on which the forked end portion is mounted, whereby the cutter cylinder is reciprocated upon rotation of the eccentric shaft.

10. Apparatus for cutting the package material of an elongated package containing a product comprising conveying means for moving the package forwardly along its longitudinal axis, gripping means disposed above said conveying means for gripping the packaging material at an upper side, a cutting means comprising a tip element, said cutting means being operable to thrust said tip element into the packaging material between the gripped upper side thereof and the product, a cylinder having a piston, a head attached to one longitudinal end of the piston, said cylinder being operable to extend the piston to cause the head to move to an extended position disposed generally on the side of the packaging material opposite the cutting means, the head being moved to the extended position at the time that the tip element is about to be thrust into the packaging material, the head thereby providing a backing support for the packaging material as the tip element is thrust into the packaging material, said gripping means being operable to release the gripped upper side of the package material after said tip element has been thrust into the packaging material, and means for actuating the cutting means to effect a scissor-like cutting action operable to cut the package material as the packaging is moved forwardly by said conveying means.

11. Apparatus for cutting the package material of an elongated package containing a product comprising conveying means for moving the package forwardly along its longitudinal axis, gripping means disposed above said conveying means for gripping the packaging material at an upper side, a cutting means comprising a tip element, said cutting means being operable to thrust said tip element into the packaging material between the gripped upper side thereof and the product, said tip element comprises a cutting blade, said cutting means further comprising a cutter plate and pivotal means pivotally mounting said cutting blade on said cutter plate such that the tip portion of the tip element is operable to be thrust into the packaging material in a direction generally perpendicular to the direction at which the package is conveyed, said gripping means being operable to release the gripped upper side of the package material after said tip element has been thrust into the packaging material, and oscillating means operable to effect oscillating movement of the cutting blade relative to the cutter plate, said cutter plate having a cutting edge cooperating with the cutting blade to provide a scissor-like cutting action with the oscillating cutter blade to cut the package material with oscillating scissor-like action as the package is moved forwardly by said conveying means.

12. Apparatus according to claim 11, wherein said conveying means comprises a first and second aligned conveyor with a space therebetween, means for operating said first conveyor intermittently such that the first conveyor is operable to advance the package and then stop the package, said gripping means gripping the package after the package has stopped its advancement.

13. Apparatus according to claim 12, wherein said first conveyor advances said package to a position wherein the forward longitudinal end portion of the package is disposed to overlie said space between said first and second conveyors.

14. Apparatus according to claim 12, wherein said gripping means overlies said space between said first and second conveyors.

15. Apparatus according to claim 12, wherein said cutting means overlies said space between said first and second conveyors, and said tip element is disposed at an elevation intermediate said gripping means and said product.

16. Apparatus according to claim 11, wherein the cutting means further comprises a retreating cylinder having a piston rod, a bent arm mounted on the cutter plate, the piston rod of the retreating cylinder being connected to the bent arm, a pivotally mounted swingable arm connected to the bent arm, the retreating cylinder being operable to swing the cutter plate about the pivotal axis of the swingable arm to an operating position generally underlying the gripping means.

17. Apparatus according to claim 11, further comprising a peeler for peeling the packaging material from the product after the packaging material has been cut by the cutting means.

* * * * *